Nov. 29, 1927.
J. K. SCHWINGER
1,651,160
AWNING FOR AUTOMOBILE WINDOWS
Filed Sept. 16, 1925
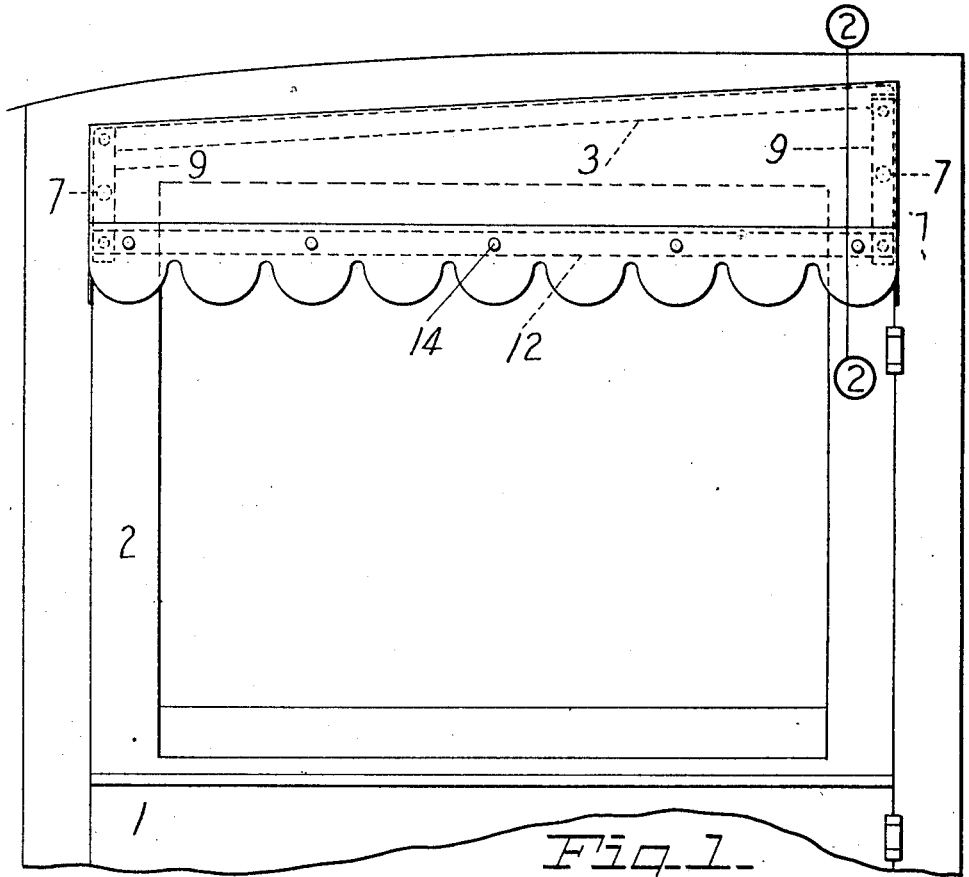
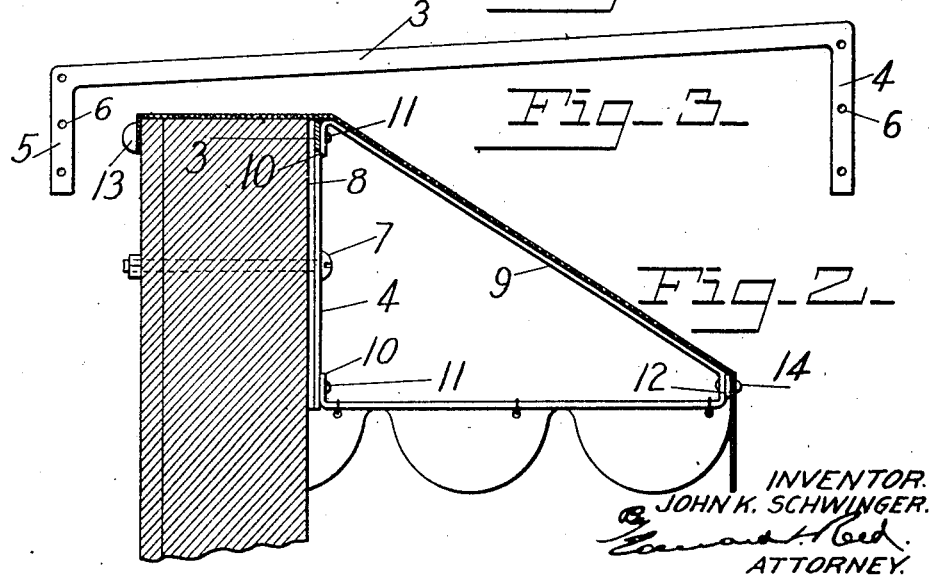
INVENTOR.
JOHN K. SCHWINGER.
ATTORNEY.

Patented Nov. 29, 1927.

1,651,160

UNITED STATES PATENT OFFICE.

JOHN K. SCHWINGER, OF MARION, OHIO.

AWNING FOR AUTOMOBILE WINDOWS.

Application filed September 16, 1925. Serial No. 56,641.

This invention relates to awnings for automobile windows and one object of the invention is to provide a simple efficient awning which can be quickly and easily attached to the automobile body; and which can be so attached to the body as to cause very little marring of the finish.

A further object of the invention is to provide an awning of such a character that it can be secured to and moved with the door of an automobile.

A further object of the invention is to provide an awning comprising a rigid frame which can be quickly and easily assembled and applied to the automobile body and to which the cover or awning proper can be easily applied.

Other objects of the invention will appear as the device is described in detail.

In the accompanying drawings Fig. 1 is a side elevation of the upper portion of an automobile door showing my awning applied thereto; Fig. 2 is a sectional view taken transversely through the awning and the upper portion of the door; and Fig. 3 is a detail view of the transverse frame member of the awning.

In these drawings I have illustrated one embodiment of my invention and have shown the same as applied to the door of an automobile but it will be understood that the awning may take various forms and may be applied to any of the windows of an automobile body.

As here shown, the automobile body comprises a door 1 provided with the usual window 2, and the awning is mounted on the door in such a position that it will extend outwardly over the upper portion of the window. Preferably the awning as a whole comprises a frame secured to the door and a cover supported by the frame and projecting downwardly and outwardly over the upper portion of the window. The awning frame may take various forms, but, in the present construction, comprises a transverse frame member 3 which is here shown in the form of a flat bar and which is provided at its ends with downwardly extending portions 4 and 5 which are preferably arranged on the respective sides of the upper end of the window. These end portions are rigidly connected with the transverse bar 3 and are preferably formed integral therewith. Each of the end portions of the frame member is provided with an opening 6 adapted to receive a small bolt 7 which extends through the frame and the door and serves to rigidly secure the frame member to the door. A very thin bolt may be used and as only two openings are necessary to attach the frame, and consequently the entire awning, to the door it will be obvious that the finish of the door is not marred to any appreciable extent, as when the awning is removed these small openings will be scarcely visible. Preferably a packing of felt or other suitable material, as shown at 8, is interposed between the frame member and the door to further protect the finish of the door. Inasmuch as the upper edges of the doors of many automobiles slope, I have shown the frame member 3 shaped to conform to the contour of the upper edge of the door but to support the awning in a substantially horizontal position. The end portions of the frame member are of different lengths and the transverse bar slopes from the top of one end portion to the top of the other end portion, as shown in Fig. 3.

Rigidly secured to the frame member 3 on opposite sides of the window are the outwardly extending end members of the awning frame. These end members may be of any suitable character but, in the present instance, I have shown them as formed from thin bars of metal which are bent into substantially triangular form, as shown at 9. The inner ends of the upper and lower bars of these end members are turned downwardly and upwardly, respectively, to form lugs 10 by means of which the end members may be rigidly secured to the respective end portions of the frame member 3, by means of rivets 11 or other suitable fastening devices. The outer portions of the end frame members are connected one to the other and rigidly braced by means of a transverse bar or frame member 12 which is secured to the small outer portions of the triangular frame members by rivets or other suitable fastening devices. Thus the frame may be assembled complete and then quickly and easily applied to the door or other part of the automobile body, and when so applied will constitute a very rigid supporting structure for the cover or awning proper.

The cover or awning proper may be of any suitable material and may be connected with the frame members in any suitable manner. In the present instance, however, I have shown the cover as formed of flexible material 15, such as canvas, which may be secured to the frame in various ways. When the awning is appled to the door of an automobile, as in the present instance, the transverse bar 3 of the awning is arranged close to the upper edge of the door and I prefer to carry the inner or upper edge of the canvas inwardly across the upper edge of the door and turn a portion of the same down and secure it to the inner surface of the door, as shown at 13, thus causing the canvas to extend across the upper edge of the frame and form a water tight joint at this point. The canvas then extends downwardly over the inclined upper edges of the end frames 9 and is secured to the transverse bar 12 at the outer edge of the frame by means of suitable fastening devices, as shown at 14. The vertical end portions of the cover, or flaps, may be formed integral with or separate from the body of the cover and are here shown as attached to the ends of the cover and as extending downwardly beyond the lower edges of the end frame members to which they may be attached in any suitable manner.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. The combination with an automobile body having a window, of an awning comprising a frame member extending transversely to said window above the same and having end portions extending downwardly on the respective sides of said window, and outwardly extending frame members rigidly secured to the respective end portions of said transverse frame member, a cover supported by said frame members, and means for securing the first mentioned frame member to said body.

2. The combination with an automobile body having a window, of an awning comprising a frame member extending transversely to said window above the same and having end portions extending downwardly on the respective sides of said window, and outwardly extending frame members rigidly secured to the respective end portions of said transverse frame member, a cover supported by said frame members, and a single fastening device for rigidly securing each of the end portions of said transverse frame member to said body.

3. An awning for an automobile window comprising a bar having downwardly extending end portions, frame members rigidly secured to the respective end portions of said bars and having their upper edges inclined downwardly and outwardly from said bar, a bar rigidly secured to the outer portions of said end frame members, a cover supported by said frame members, and means for attaching the first mentioned bar to the body of said automobile.

4. The combination of an automobile having a door provided with a window and having a sloping upper edge, of a bar extending along and substantially parallel with the sloping edge of said door, said bar having downwardly extending portions at the respective ends thereof, said end portions being of different length and having their lower ends arranged in substantially the same horizontal plane, substantially triangular end frame members rigidly secured to the respective downwardly extending portions of said bar and having their upper edges sloping downwardly and outwardly from the transverse portion of said bar, a second bar arranged in substantially a horizontal position and rigidly secured to the outer portions of said end frame members, a cover supported by said frame members, and means for securing the first mentioned bar to said door.

In testimony whereof, I affix my signature hereto.

JOHN K. SCHWINGER.